United States Patent
Wang et al.

(10) Patent No.: US 10,891,134 B2
(45) Date of Patent: Jan. 12, 2021

(54) METHOD AND APPARATUS FOR EXECUTING INSTRUCTION FOR ARTIFICIAL INTELLIGENCE CHIP

(71) Applicant: BEIJING BAIDU NETCOM SCIENCE AND TECHNOLOGY CO., LTD., Beijing (CN)

(72) Inventors: Yong Wang, Beijing (CN); Jiaxin Shi, Beijing (CN); Rong Chen, Beijing (CN); Jinchen Han, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/505,913

(22) Filed: Jul. 9, 2019

(65) Prior Publication Data

US 2020/0050457 A1     Feb. 13, 2020

(30) Foreign Application Priority Data

Aug. 10, 2018    (CN) .......................... 2018 1 0907325

(51) Int. Cl.
     *G06F 9/30*          (2018.01)
     *G06F 9/38*          (2018.01)
     *G06N 5/02*         (2006.01)

(52) U.S. Cl.
     CPC ............. *G06F 9/3838* (2013.01); *G06N 5/02* (2013.01)

(58) Field of Classification Search
None
See application file for complete search history.

(56) References Cited

U.S. PATENT DOCUMENTS

| | | | | | |
|---|---|---|---|---|---|
| 5,704,012 A | * | 12/1997 | Bigus | .................... | G06F 9/5011 706/19 |
| 5,740,325 A | * | 4/1998 | Wang | .................... | G06F 9/3879 706/16 |
| 2016/0378661 A1 | * | 12/2016 | Gray | .................. | G06F 11/3433 712/237 |
| 2020/0050476 A1 | * | 2/2020 | Xu | .......................... | G06F 9/463 |

FOREIGN PATENT DOCUMENTS

| KR | 20100122875 A | 11/2010 |
|---|---|---|
| KR | 20130107361 A | 10/2013 |

* cited by examiner

*Primary Examiner* — Corey S Faherty
(74) *Attorney, Agent, or Firm* — von Briesen & Roper, s.c.

(57) ABSTRACT

Embodiments of the present disclosure disclose a method and apparatus for executing an instruction for an artificial intelligence chip. A specific embodiment of the method comprises: receiving descriptive information for describing a neural network model sent by a central processing unit, the descriptive information including at least one operation instruction; analyzing the descriptive information to acquire the at least one operation instruction; determining, for an operation instruction of the at least one operation instruction, a special-purpose execution component executing the operation instruction, and locking the determined special-purpose execution component; sending the operation instruction to the determined special-purpose execution component; and unlocking the determined special-purpose execution component in response to receiving a notification for instructing the operation instruction being completely executed.

17 Claims, 8 Drawing Sheets

METHOD AND APPARATUS FOR EXECUTING INSTRUCTION FOR ARTIFICIAL INTELLIGENCE CHIP

CROSS-REFERENCE TO RELATED APPLICATIONS

This application claims priority to Chinese Application No. 201810907325.6, filed on Aug. 10, 2018 and entitled "Method and Apparatus for Executing Instruction for Artificial Intelligence Chip," the entire disclosure of which is hereby incorporated by reference.

TECHNICAL FIELD

Embodiments of the present disclosure relate to the field of computer technology, and specifically to a method and apparatus for executing an instruction for an artificial intelligence chip.

BACKGROUND

In recent years, with the emergence and development of the model algorithm represented by deep learning, the neural network model has been widely used in various fields, such as voice recognition, image recognition, or natural language processing.

In the neural network model, there exists a large number of compute-intensive operators, e.g., matrix computation, convolution, pooling, activation, and standardization. Since these operations are very time consuming, the computing power of the conventional CPU (central processing unit) is difficult to meet the requirements, so that heterogeneous computing becomes prevailing. And thus, various special-purpose processors for neural network are developed, such as GPU (Graphics Processing Unit), FPGA (Field-Programmable Gate Array), or ASIC (Application Specific Integrated Circuits).

In the prior art, task scheduling for the neural network processor can be implemented through the host CPU. For example, the host CPU continuously interacts with the neural network processor, thereby implementing the task scheduling for the neural network processor.

SUMMARY

Embodiments of the present disclosure present a method and apparatus for executing an instruction for an artificial intelligence chip.

In a first aspect, an embodiment of the present disclosure provides a method for executing an instruction for an artificial intelligence chip. The artificial intelligence chip includes at least one general-purpose execution component and at least one special-purpose execution component. The method includes: receiving descriptive information for describing a neural network model sent by a central processing unit, the descriptive information including at least one operation instruction; analyzing the descriptive information to acquire the at least one operation instruction; determining, for an operation instruction of the at least one operation instruction, a special-purpose execution component executing the operation instruction, and locking the determined special-purpose execution component; sending the operation instruction to the determined special-purpose execution component; and unlocking the determined special-purpose execution component in response to receiving a notification for instructing the operation instruction being completely executed.

In some embodiments, the locking the determined special-purpose execution component includes: acquiring a lock of the determined special-purpose execution component; and performing the locking operation in response to success in acquiring the lock.

In some embodiments, the locking the determined special-purpose execution component further includes: querying a lock state of the determined special-purpose execution component by polling in response to failure in acquiring the lock; and continuing acquiring the lock of the determined special-purpose execution component to perform the locking operation in response to querying the lock state of the determined special-purpose execution component being unlocked.

In some embodiments, the locking the determined special-purpose execution component further includes: entering a waiting state in response to failure in acquiring the lock; and exiting the waiting state in response to receiving a wakeup notification for instructing the determined special-purpose execution component being unlocked, and continuing acquiring the lock of the determined special-purpose execution component to perform the locking operation.

In some embodiments, the method further includes: sending a notification for instructing the at least one operation instruction being completely executed to the central processing unit in response to determining the at least one operation instruction being completely executed.

In some embodiments, the at least one general-purpose execution component is connected in parallel, and the at least one special-purpose execution component is connected in series.

In some embodiments, the at least one general-purpose execution component includes a programmable general-purpose computing graphics processor, and the at least one special-purpose execution component includes at least one of: a convolution engine, a single data processor, a plane data processor, a channel data processor, a special-purpose memory, or a data restructuring engine.

In a second aspect, an embodiment of the present disclosure provides an apparatus for executing an instruction for an artificial intelligence chip. The artificial intelligence chip includes at least one general-purpose execution component and at least one special-purpose execution component. The apparatus includes: an information receiving unit, configured to receive descriptive information for describing a neural network model sent by a central processing unit, the descriptive information including at least one operation instruction; an information analyzing unit, configured to analyze the descriptive information to acquire the at least one operation instruction; and an instruction sending unit, configured to determine, for an operation instruction of the at least one operation instruction, a special-purpose execution component executing the operation instruction, and lock the determined special-purpose execution component; send the operation instruction to the determined special-purpose execution component; and unlock the determined special-purpose execution component in response to receiving a notification for instructing the operation instruction being completely executed.

In some embodiments, the instruction sending unit includes: a lock acquiring module, configured to acquire a lock of the determined special-purpose execution component; and a locking module, configured to perform the locking operation in response to success in acquiring the lock.

In some embodiments, the locking module is further configured to: query a lock state of the determined special-purpose execution component by polling in response to failure in acquiring the lock; and continue acquiring the lock of the determined special-purpose execution component to perform the locking operation in response to querying the lock state of the determined special-purpose execution component being unlocked.

In some embodiments, the locking module is further configured to: enter a waiting state in response to failure in acquiring the lock; and exit the waiting state in response to receiving a wakeup notification for instructing the determined special-purpose execution component being unlocked, and continue acquiring the lock of the determined special-purpose execution component to perform the locking operation.

In some embodiments, the apparatus further includes: a notification sending unit, configured to send a notification for instructing the at least one operation instruction being completely executed to the central processing unit in response to determining the at least one operation instruction being completely executed.

In some embodiments, the at least one general-purpose execution component is connected in parallel, and the at least one special-purpose execution component is connected in series.

In some embodiments, the at least one general-purpose execution component includes a programmable general-purpose computing graphics processor, and the at least one special-purpose execution component includes at least one of: a convolution engine, a single data processor, a plane data processor, a channel data processor, a special-purpose memory, or a data restructuring engine.

In a third aspect, an embodiment of the present disclosure provides an artificial intelligence chip. The artificial intelligence chip includes at least one general-purpose execution component and at least one special-purpose execution component. The general-purpose execution component is configured to: receive descriptive information for describing a neural network model sent by a central processing unit, the descriptive information including at least one operation instruction; analyze the descriptive information to acquire the at least one operation instruction; determine, for an operation instruction of the at least one operation instruction, a special-purpose execution component executing the operation instruction, and lock the determined special-purpose execution component; send the operation instruction to the determined special-purpose execution component; and unlock the determined special-purpose execution component in response to receiving a notification for instructing the operation instruction being completely executed. The special-purpose execution component is configured to: execute, in response to receiving the operation instruction sent by the general-purpose execution component, the received operation instruction; and return the notification for instructing the operation instruction being completely executed after the received operation instruction is completely executed.

In a fourth aspect, an embodiment of the present disclosure provides a computer readable medium, storing a computer program thereon, where the computer program, when executed by an execution component, implements the method according to any one implementation in the first aspect.

In a fifth aspect, an embodiment of the present disclosure provides an electronic device, including: a central processing unit, a storage apparatus, and at least one of the artificial intelligence chip according to the third aspect.

The method and apparatus for executing an instruction for an artificial intelligence chip provided in the embodiments of the present disclosure receive descriptive information for describing a neural network model sent by a central processing unit, then analyze the descriptive information to acquire at least one operation instruction, then determine a special-purpose execution component executing the operation instruction, lock the special-purpose execution component, then send the operation instruction to the special-purpose execution component for processing, and finally unlock the special-purpose execution component after the operation instruction is completely executed, thereby avoiding frequent interaction between the artificial intelligence chip and the CPU, and improving the performance of the artificial intelligence chip.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
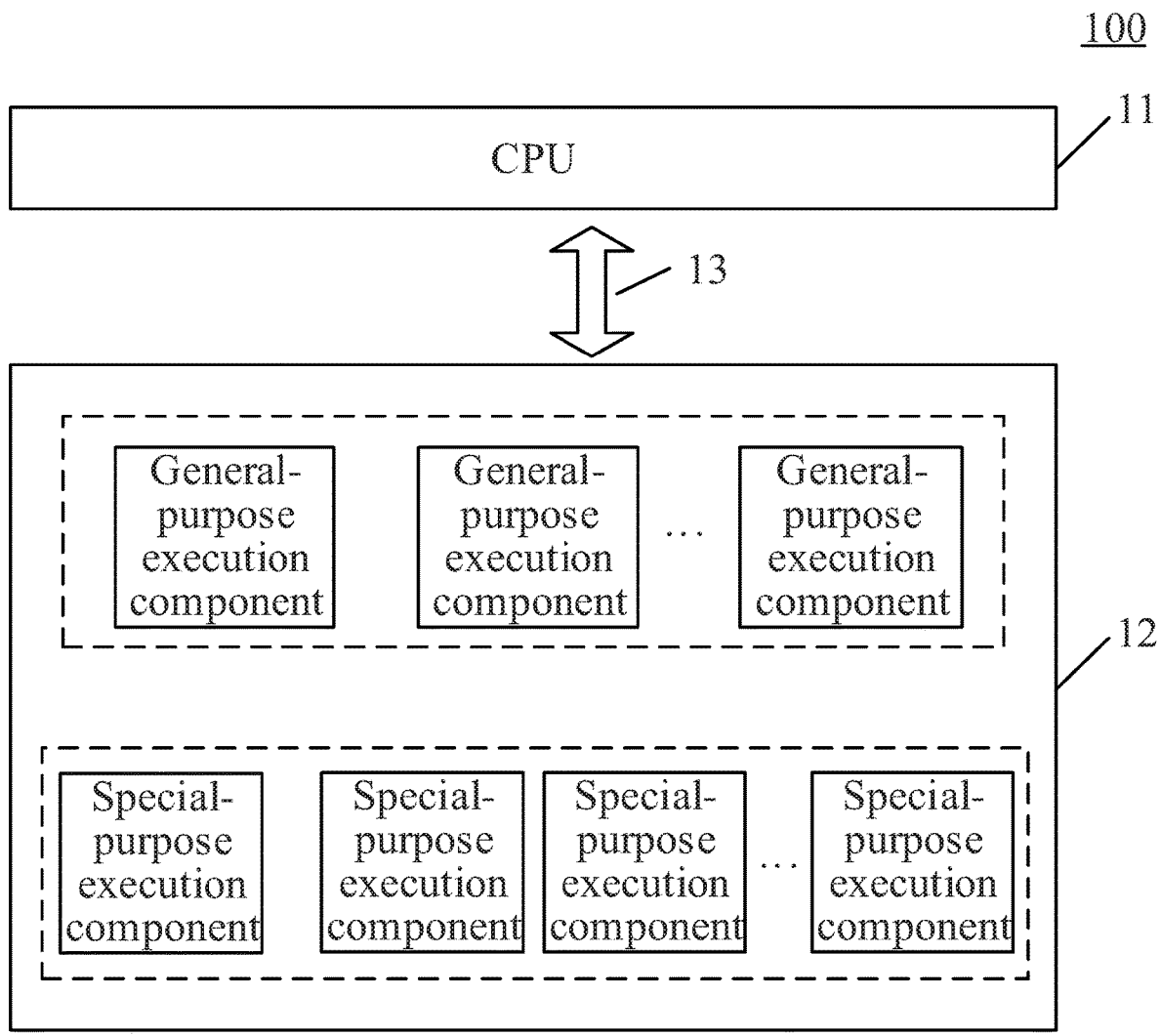
FIG. 1 is an architectural diagram of an exemplary system in which an embodiment of the present disclosure may be implemented.

FIG. 1 shows an exemplary system architecture 100 in which an embodiment of a method for executing an instruction for an artificial intelligence chip or an apparatus for executing an instruction for an artificial intelligence chip of the present disclosure may be implemented.

As shown in FIG. 1, the system architecture 100 may include a CPU 11, an artificial intelligence chip 12, and a bus 13. The bus 13 serves as a medium providing a communication link between the CPU 11 and the artificial intelligence chip 12, e.g., a PCIE (Peripheral Component Interconnect Express) bus.

The CPU 11 may interact with the artificial intelligence chip 12 via the bus 13 to send and receive messages. The CPU 11 can send descriptive information of a neural network model to the artificial intelligence chip 12, and receive a processing result returned by the artificial intelligence chip 12.

The artificial intelligence chip 12, also referred to as an AI accelerator card or computing card, is specially used for processing a large amount of compute-intensive computational tasks in artificial intelligence applications. The artificial intelligence chip 12 may include at least one general-purpose execution component and at least one special-purpose execution component. The general-purpose execution component is communicatively connected to the special-purpose execution components respectively. The general-purpose execution component can receive and analyze the descriptive information of the neural network model sent by the CPU 11, and then send analyzed operation instruction to a specific special-purpose execution component (e.g., a special-purpose execution component locked by the general-purpose execution component). The special-purpose execution component can execute the operation instruction sent by the general-purpose execution component.

It should be noted that the method for executing an instruction for an artificial intelligence chip provided in the embodiments of the present disclosure is generally executed by the general-purpose execution component. Accordingly, the apparatus for executing an instruction for an artificial intelligence chip is generally provided in the general-purpose execution component.

It should be understood that the numbers of CPUs, buses, artificial intelligence chips, general-purpose execution components, and special-purpose execution components in FIG. 1 are merely illustrative. Any suitable number of CPUs, buses, artificial intelligence chips, general-purpose execution components, and special-purpose execution components may be provided based on actual requirements.

Figure 2:
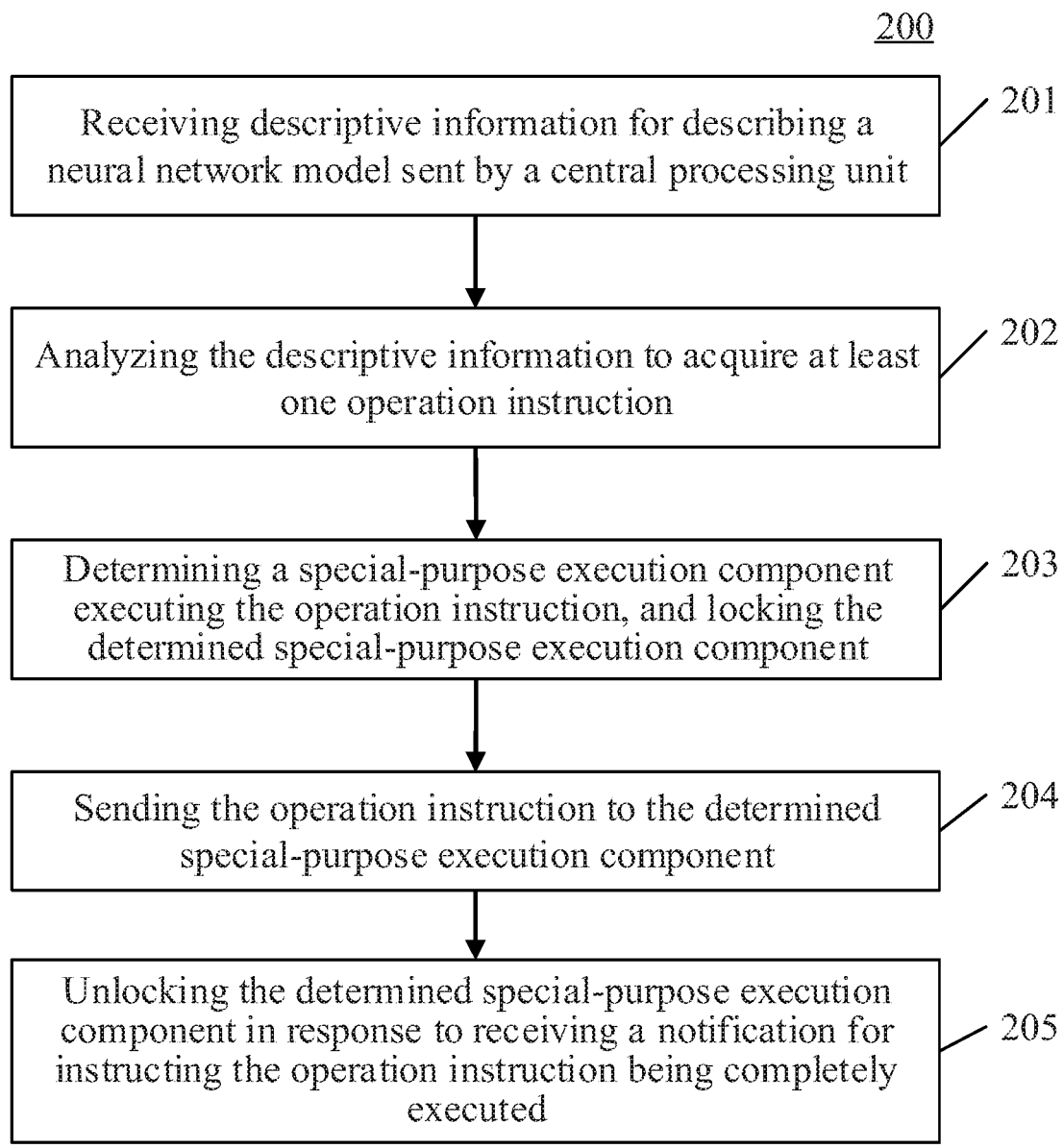
FIG. 2 is a flowchart of an embodiment of a method for executing an instruction for an artificial intelligence chip according to the present disclosure.

Further referring to FIG. 2, a process 200 of an embodiment of a method for executing an instruction for an artificial intelligence chip according to the present disclosure is shown. The method for executing an instruction for an artificial intelligence chip may include the following steps.

Step 201, receiving descriptive information for describing a neural network model sent by a CPU.

In the present embodiment, the artificial intelligence chip may include at least one general-purpose execution component and at least one special-purpose execution component. The artificial intelligence chip may be communicatively connected to the CPU. An executing body (e.g., the general-purpose execution component of the artificial intelligence chip 12 in FIG. 1) of the method for executing an instruction for an artificial intelligence chip can receive descriptive information for describing the neural network model sent by the CPU. The descriptive information may include at least one operation instruction. Here, the operation instruction may be an instruction that can be executed by the special-purpose execution component of the artificial intelligence chip, e.g., a matrix calculation instruction, or a vector operation instruction. The descriptive information may be various kinds of information, e.g., a static map, and a data flow diagram, that use a language interpretable by the general-purpose execution component of the artificial intelligence chip to describe the neural network model.

Here, the neural network model may be an artificial neural network (ANN). The artificial neural network is a simple model that is established through abstracting neural network of human brain using a mathematical and physical method based on basic understanding of the neural network of human brain from the perspective of information processing. For example, the neural network model may include a convolutional neural network (CNN) model, a deep neural network (DNN) model, or the like.

Step 202, analyzing the descriptive information to acquire at least one operation instruction.

In the present embodiment, the executing body can analyze the descriptive information received in Step 201 to acquire the at least one operation instruction included in the descriptive information.

Step 203, determining a special-purpose execution component executing the operation instruction, and locking the determined special-purpose execution component.

In the present embodiment, for each operation instruction of the at least one operation instruction, the executing body can determine a special-purpose execution component executing the operation instruction, and then lock the determined special-purpose execution component. As an example, the operation instruction is a convolution instruction, then the special-purpose execution component executing the operation instruction can be determined as a convolution engine (an integrated circuit with which the convolution operation is integrated), and the convolution engine can be locked.

In the present embodiment, since each general-purpose execution component is communicatively connected to the special-purpose execution components, i.e., each special-purpose execution component can be invoked by a plurality of general-purpose execution components to execute an operation instruction, a locking mechanism can be employed to avoid producing a conflict between the general-purpose execution components when invoking the special-purpose execution components. For example, each special-purpose execution component may have an invokable lock. Here, the lock may be implemented by software programming. Locking the special-purpose execution component can be implemented by invoking a locking method of the lock of the special-purpose execution component (i.e., the locked special-purpose execution component cannot be invoked by other general-purpose execution components).

In some alternative implementations of the present embodiment, the locking the determined special-purpose execution component may specifically include: first attempting to acquire a lock of the determined special-purpose execution component; and then executing the locking operation in response to success in acquiring the lock. As an example, in a circumstance where the determined special-purpose execution component is a convolution engine, the executing body can attempt to acquire a lock of the convolution engine, and invoke a locking method of the acquired lock to lock the convolution engine if the lock of the convolution engine is acquired.

In some alternative implementations of the present embodiment, the locking the determined special-purpose execution component may specifically include: first attempting to acquire the lock of the determined special-purpose execution component; then querying a lock state of the determined special-purpose execution component by polling in response to failure in acquiring the lock; and then continuing acquiring the lock of the determined special-purpose execution component to perform the locking operation in response to querying the lock state of the determined special-purpose execution component being unlocked. As an example, in a circumstance where the determined special-purpose execution component is a convolution engine, and the convolution engine is locked by another general-purpose execution component, the executing body can query (e.g., continuously query at predetermined time intervals) a lock state of the convolution engine by polling after failing in attempting to acquire the lock of the convolution engine, reattempt to acquire the lock of the convolution engine in response to querying the lock state of the convolution engine being unlocked (i.e., the convolution engine is released by another general-purpose execution component), and invokes the locking method of the acquired lock to lock the convolution engine if succeeding in acquiring the lock.

Step 204, sending the operation instruction to the determined special-purpose execution component.

In the present embodiment, for each operation instruction of the at least one operation instruction, the executing body can send the operation instruction to the special-purpose execution component executing the operation instruction, i.e., the special-purpose execution component determined in Step 203, after locking the special-purpose execution component executing the operation instruction. The special-purpose execution component may be configured to: execute the operation instruction sent by the general-purpose execution component, and return a notification that the operation instruction is completely executed after the operation instruction is completely executed.

In some alternative implementations of the present embodiment, the notification for instructing the operation instruction being completely executed may include an interrupt (an approach of communication between a processing unit and a hardware device). Here, the interrupt may be hardware interrupt, or software interrupt.

Step 205, unlocking the determined special-purpose execution component in response to receiving a notification for instructing the operation instruction being completely executed.

In the present embodiment, for each operation instruction of the at least one operation instruction, the executing body can unlock the special-purpose execution component executing the operation instruction (e.g., release the special-purpose execution component by invoking an unlocking method of the lock of the special-purpose execution component) after receiving a notification instructing the operation instruction completely executed.

In general, the descriptive information of the neural network model may include a plurality of operation instructions. Therefore, Step 203 to Step 205 may be successively executed several times, until all of the operation instructions are completely executed.

In some alternative implementations of the present embodiment, the method for executing an instruction for an artificial intelligence chip may further include: sending a notification for instructing the at least one operation instruction being completely executed to the CPU in response to determining the at least one operation instruction being completely executed.

Alternatively, the notification for instructing the at least one operation instruction being completely executed may include an interrupt. Here, the interrupt may be hardware interrupt, or software interrupt.

In some alternative implementations of the present embodiment, the at least one general-purpose execution component may be communicatively connected in parallel, and the at least one special-purpose may be communicatively connected in series.

In some alternative implementations of the present embodiment, the at least one general-purpose execution component may include a programmable general-purpose computing graphics processor, e.g., an ARM (Advanced RISC Machine or Acorn RISC Machine, Advanced reduced instruction set computer) core, and a 51 core. The at least one special-purpose execution component may include, but is not limited to, at least one of: a convolution engine, a single data processor, a plane data processor, a channel data processor, a special-purpose memory, or a data restructuring engine. The convolution engine is configured for processing data of a convolutional layer of the neural network model. The single data processor is configured for processing data of an activation function layer of the neural network model. The plane data processor is configured for processing data of a pooling layer of the neural network model. The channel data processor is configured for processing data of a standardization layer of the neural network model. The special-purpose memory and the data restructuring engine are configured for tensor remodeling and accelerating conversion from a copy operation memory to a memory.

Figure 3A:
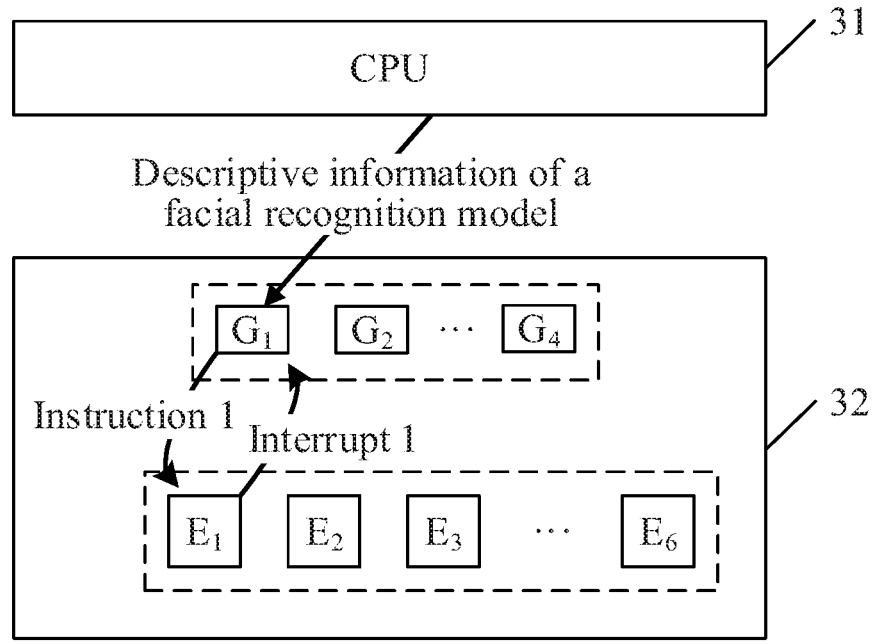
FIG. 3A to FIG. 3C are schematic diagrams of an application scenario of the method for executing an instruction for an artificial intelligence chip according to the present disclosure.
Figure 3B:
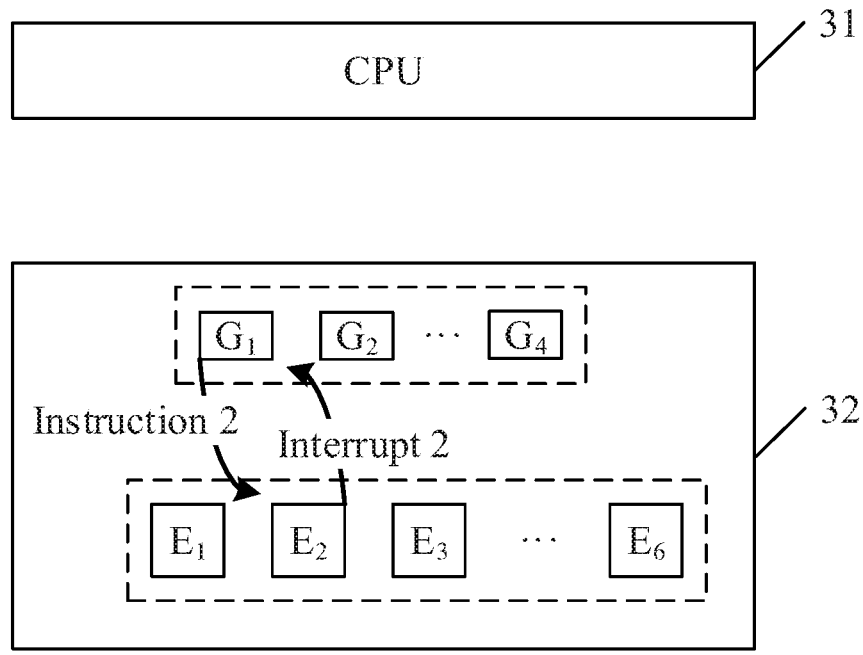
Figure 3C:
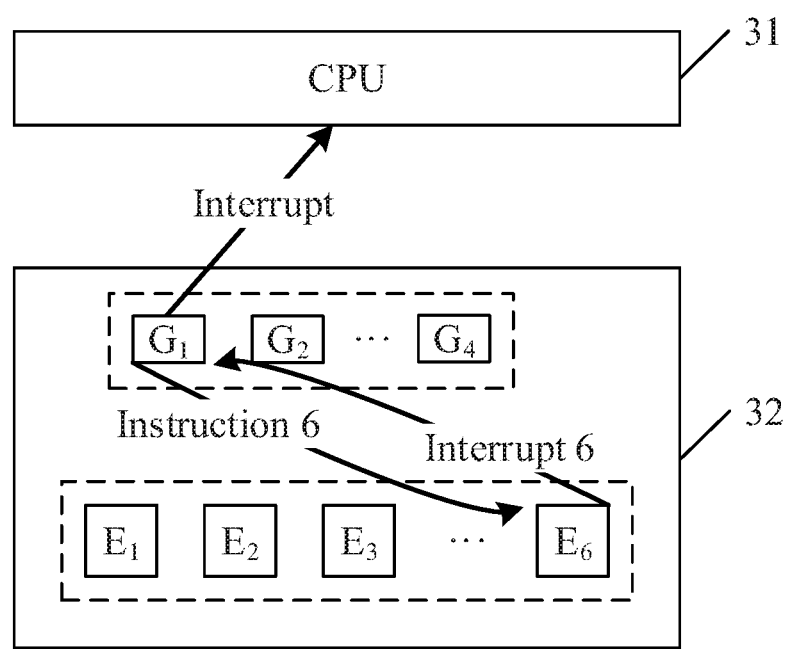

Further referring to FIG. 3A to FIG. 3C, an application scenario of the method for executing an instruction for an artificial intelligence chip according to the present disclosure is shown. In FIG. 3A, a CPU 31 sends descriptive information of a facial recognition model to a general-purpose executing module G1 among general-purpose executing modules G1-G4 in an artificial intelligence chip 32. The general-purpose executing module G1 analyzes the descriptive information to acquire instructions 1 to 6. The general-purpose executing module G1 first determines a special-purpose executing module executing the instruction 1 being a special-purpose executing module E1 from special-purpose executing modules E1 to E6. Then, after acquiring a lock of the special-purpose executing module E1 and locking the special-purpose executing module E1, the general-purpose executing module G1 sends the instruction 1 to the special-purpose executing module E1 (the instruction 1 to be executed by the special-purpose executing module E1), and waits for feedback on execution of the instruction 1. Finally, the general-purpose executing module G1 receives an interrupt 1 returned by the special-purpose executing module E1 (i.e., the instruction 1 is completely executed). Likewise, in FIG. 3B, the general-purpose executing module G1 continues determining a special-purpose executing module executing the instruction 2 being a special-purpose executing module E2 from special-purpose executing modules E1 to E6. Then, after acquiring a lock of the special-purpose executing module E2 and locking the special-purpose executing module E2, the general-purpose executing module G1 sends the instruction 2 to the special-purpose executing module E2 (the instruction 2 to be executed by the special-purpose executing module E2), and waits for feedback on execution of the instruction 2. Finally, the general-purpose executing module G1 receives an interrupt 2 returned by the special-purpose executing module E2 (i.e., the instruction 2 is completely executed). Likewise, until the instruction 6, as shown in FIG. 3C, the general-purpose executing module G1 continues determining a special-purpose executing module executing the instruction 6 being a special-purpose executing module E6 from special-purpose executing modules E1 to E6. Then, after acquiring a lock of the special-purpose executing module E6 and locking the special-purpose executing module E6, the general-purpose executing module G1 sends the instruction 6 to the special-purpose executing module E6 (the instruction 6 to be executed by the special-purpose executing module E6), and waits for feedback on execution of the instruction 6. Finally, the general-purpose executing module G1 receives an interrupt 6 returned by the special-purpose executing module E6 (i.e., the instruction 6 is completely executed), so that the general-purpose executing module G1 can determine that all instructions in the descriptive information of the facial recognition model are completely executed, and send an interrupt to the CPU 31.

The method for executing an instruction for an artificial intelligence chip provided in the above embodiments of the present disclosure receives descriptive information of a neural network model sent by a CPU, then analyzes the descriptive information to acquire at least one operation instruction, then determines a special-purpose execution component executing the operation instruction, locks the special-purpose execution component, then sends the operation instruction to the special-purpose execution component executing the operation instruction, waits for feedback on execution from the special-purpose execution component, and finally unlocks the special-purpose execution component executing the operation instruction after receiving a notification that the operation instruction is completely executed, thereby avoiding frequent interaction between the artificial intelligence chip and the CPU, and improving the performance of the artificial intelligence chip.

Figure 4:
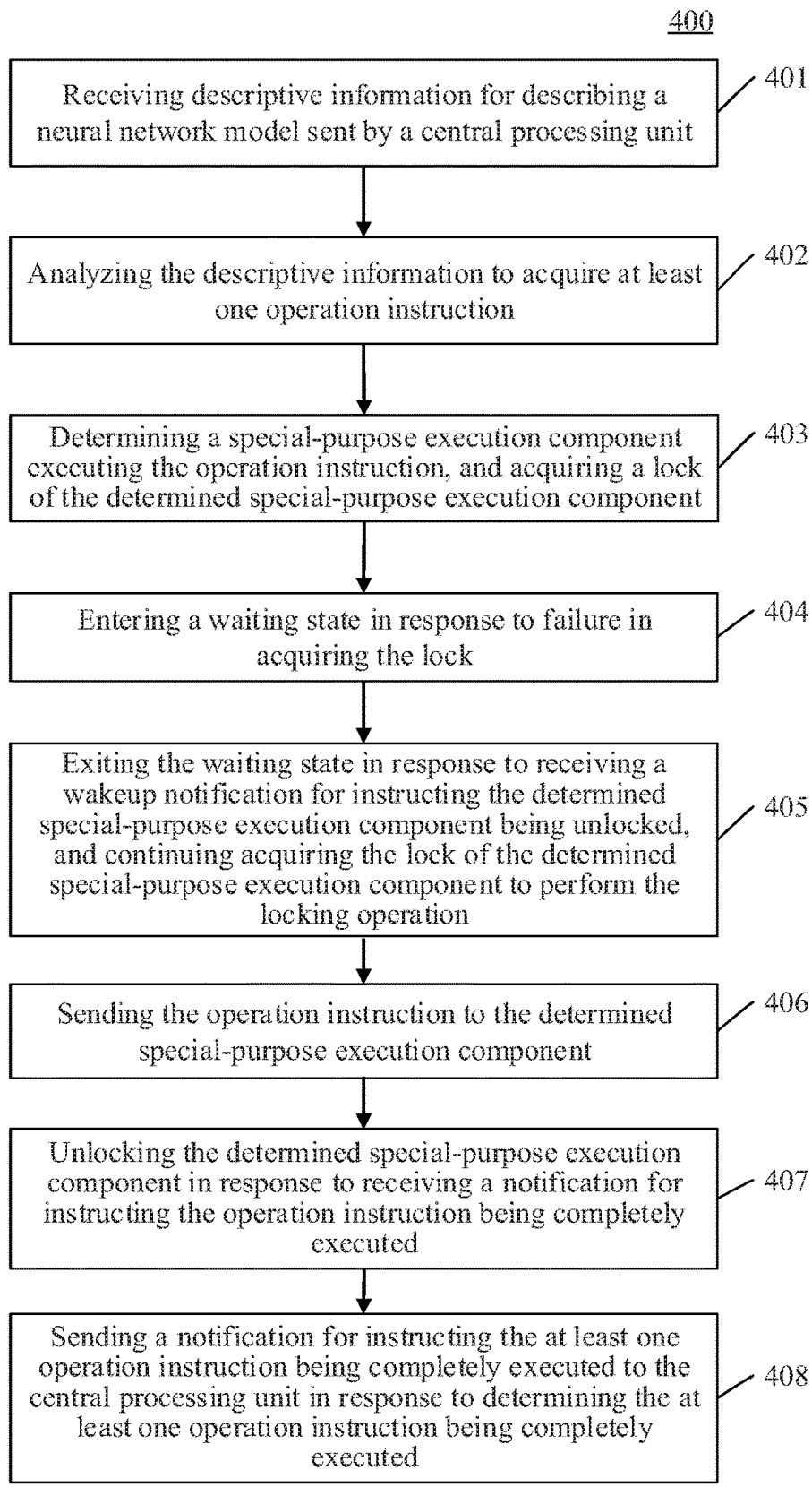
FIG. 4 is a flowchart of another embodiment of the method for executing an instruction for an artificial intelligence chip according to the present disclosure.

Further referring to FIG. 4, a process 400 of an embodiment of the method for executing an instruction for an artificial intelligence chip according to the present disclosure is shown. The method for executing an instruction for an artificial intelligence chip may include the following steps.

Step 401, receiving descriptive information for describing a neural network model sent by a CPU.

In the present embodiment, the artificial intelligence chip may include at least one general-purpose execution component and at least one special-purpose execution component. The artificial intelligence chip may be communicatively connected to the CPU. An executing body (e.g., the general-purpose execution component of the artificial intelligence chip 12 in FIG. 1) of the method for executing an instruction for an artificial intelligence chip can receive descriptive information for describing the neural network model sent by the CPU. The descriptive information may include at least one operation instruction. Here, the operation instruction may be an instruction that can be executed by the special-purpose execution component of the artificial intelligence chip, e.g., a matrix calculation instruction, or a vector operation instruction. The descriptive information may include various kinds of information, e.g., a static map, and a data flow diagram, that use a language interpretable by the general-purpose execution component of the artificial intelligence chip to describe the neural network model.

Step 402, analyzing the descriptive information to acquire at least one operation instruction.

In the present embodiment, the executing body can analyze the descriptive information received in Step 401 to acquire the at least one operation instruction included in the descriptive information.

Step 403, determining a special-purpose execution component executing the operation instruction, and acquiring a lock of the determined special-purpose execution component.

In the present embodiment, for each operation instruction of the at least one operation instruction, the executing body can determine a special-purpose execution component executing the operation instruction, and then attempt to acquire a lock of the determined special-purpose execution component. As an example, the operation instruction is a convolution instruction, then the special-purpose execution component executing the operation instruction can be determined as a convolution engine, and a lock of the convolution engine can be acquired.

Step 404, entering a waiting state in response to failure in acquiring the lock.

In the present embodiment, for each operation instruction of the at least one operation instruction, the executing body can enter a waiting state (i.e., a current thread enters a dormant state) after failing in acquiring a special-purpose execution component executing the operation instruction (i.e., the special-purpose execution component executing the operation instruction is locked by another general-purpose execution component), until being wakened (e.g., being wakened by receiving a wakeup notification).

Step 405, exiting the waiting state in response to receiving a wakeup notification for instructing the determined special-purpose execution component being unlocked, and continuing acquiring the lock of the determined special-purpose execution component to perform the locking operation.

In the present embodiment, for each operation instruction of the at least one operation instruction, the executing body can exit the waiting state after receiving a wakeup notification (i.e., the special-purpose executing module executing the operation instruction is unlocked/released by another general-purpose executing module), and then reattempt to acquire the lock of the special-purpose executing module executing the operation instruction. If the acquiring the lock is successful, then the special-purpose executing module executing the operation instruction is locked, e.g., locked by invoking a locking method of the acquired lock.

Step 406, sending the operation instruction to the determined special-purpose execution component.

In the present embodiment, for each operation instruction of the at least one operation instruction, the executing body can send the operation instruction to the special-purpose execution component executing the operation instruction, i.e., the special-purpose execution component determined in Step 403, after locking the special-purpose execution component executing the operation instruction. The special-purpose execution component may be configured to: execute the operation instruction sent by the general-purpose execution component, and return a notification that the operation instruction is completely executed after the operation instruction is completely executed.

Step 407, unlocking the determined special-purpose execution component in response to receiving a notification for instructing the operation instruction being completely executed.

In the present embodiment, for each operation instruction of the at least one operation instruction, the executing body can unlock the special-purpose execution component executing the operation instruction (e.g., release the special-purpose execution component by invoking an unlocking method of the lock of the special-purpose execution component) after receiving the notification instructing the operation instruction being completely executed.

Step 408, sending a notification for instructing the at least one operation instruction being completely executed to the CPU in response to determining the at least one operation instruction being completely executed.

In the present embodiment, the executing body can send a notification for instructing the at least one operation instruction being completely executed to the CPU to facilitate the CPU continuing subsequent processing, after determining the at least one operation instruction being completely executed (e.g., determining receiving an interrupt of the at least one operation instruction).

As can be seen from FIG. 4, compared with the embodiment corresponding to FIG. 2, the process 400 of the method for executing an instruction for an artificial intelligence chip in the present embodiment highlights entering a waiting state after failing in acquiring the lock and sending a notification of completing the execution to the CPU. Therefore, the solution according to the present embodiment can reduce costs of the general-purpose executing module, and improve the efficiency of acquiring the execution progress of the neural network model by the CPU.

Figure 5:
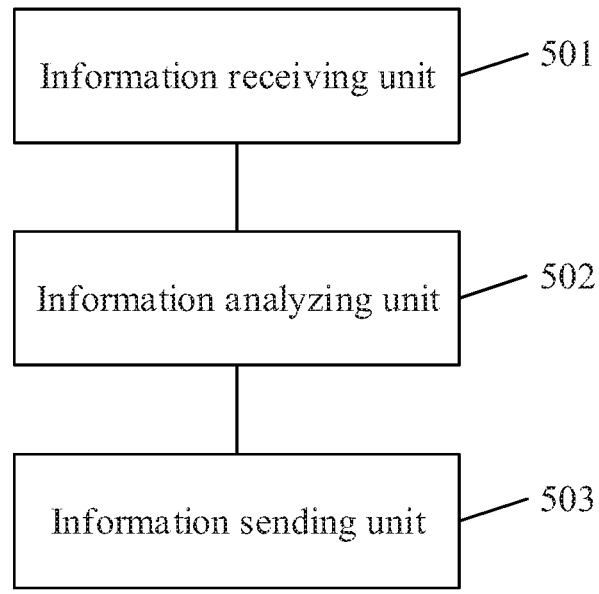
FIG. 5 is a schematic structural diagram of an embodiment of an apparatus for executing an instruction for an artificial intelligence chip according to the present disclosure.

Further referring to FIG. 5, as an implementation of the method shown in FIG. 2 and FIG. 4, the present disclosure provides an embodiment of an apparatus for executing an instruction for an artificial intelligence chip. The embodiment of the apparatus corresponds to the embodiment of the method shown in FIG. 2, and the apparatus may be specifically applied to a general-purpose execution component of an artificial intelligence chip.

As shown in FIG. 5, the apparatus 500 for executing an instruction for an artificial intelligence chip in the present embodiment may include an information receiving unit 501, an information analyzing unit 502, and an instruction sending unit 503. The information receiving unit 501 is configured to receive descriptive information for describing a neural network model sent by a CPU, the descriptive information including at least one operation instruction; the information analyzing unit 502 is configured to analyze the descriptive information to acquire the at least one operation instruction; and the instruction sending unit 503 is configured to: determine, for an operation instruction of the at least one operation instruction, a special-purpose execution component executing the operation instruction, and lock the determined special-purpose execution component; send the operation instruction to the determined special-purpose execution component; and unlock the determined special-purpose execution component in response to receiving a notification for instructing the operation instruction being completely executed.

In the present embodiment, the artificial intelligence chip may include at least one general-purpose execution component and at least one special-purpose execution component. The artificial intelligence chip may be communicatively connected to the CPU. The information receiving unit 501 of the apparatus 500 for executing an instruction for an artificial intelligence chip can receive descriptive information for describing the neural network model sent by the CPU. The descriptive information may include at least one operation instruction. Here, the operation instruction may be an instruction that can be executed by the special-purpose execution component of the artificial intelligence chip, e.g., a matrix calculation instruction, or a vector operation instruction. The descriptive information may be various kinds of information, e.g., a static map, and a data flow diagram, that use an interpretable language for the general-purpose execution component of the artificial intelligence chip to describe the neural network model.

In the present embodiment, the information analyzing unit 502 can analyze the descriptive information received by the information receiving unit 501 to acquire the at least one operation instruction included in the descriptive information.

In the present embodiment, for each operation instruction of the at least one operation instruction, the instruction sending unit 503 can determine a special-purpose execution component executing the operation instruction, lock the determined special-purpose execution component, then send the operation instruction to the special-purpose execution component executing the operation instruction; and then unlock the special-purpose execution component executing the operation instruction after receiving a notification instructing the operation instruction being completely executed. The special-purpose execution component may be configured to execute the operation instruction sent by the general-purpose execution component, and return the notification that the operation instruction is completely executed after the operation instruction is completely executed.

In some alternative implementations of the present embodiment, the instruction sending unit 503 may include a lock acquiring module and a locking module. The lock acquiring module is configured to acquire a lock of the determined special-purpose execution component; and the locking module is configured to perform the locking operation in response to success in acquiring the lock.

Alternatively, the locking module may be further configured to: query a lock state of the determined special-purpose execution component by polling in response to failure in acquiring the lock; and continue acquiring the lock of the determined special-purpose execution component to perform the locking operation in response to querying the lock state of the determined special-purpose execution component being unlocked.

Alternatively, the locking module may be further configured to: enter a waiting state in response to failure in acquiring the lock; and exit the waiting state in response to receiving a wakeup notification for instructing the determined special-purpose execution component being unlocked, and continue acquiring the lock of the determined special-purpose execution component to perform the locking operation.

In some alternative implementations of the present embodiment, the notification that the operation instruction is completely executed may include an interrupt (an approach of communication between a processing unit and a hardware device). Here, the interrupt may be hardware interrupt, or software interrupt.

In some alternative implementations of the present embodiment, the apparatus 500 may further include a notification sending unit. The notification sending unit is configured to send a notification for instructing the at least one operation instruction being completely executed to the CPU in response to determining the at least one operation instruction being completely executed.

In some alternative implementations of the present embodiment, the at least one general-purpose execution component may be communicatively connected in parallel, and the at least one special-purpose may be communicatively connected in series.

In some alternative implementations of the present embodiment, the at least one general-purpose execution component may include a programmable general-purpose computing graphics processor, e.g., an ARM core, and a 51 core. The at least one special-purpose execution component may include, but is not limited to, at least one of: a convolution engine, a single data processor, a plane data processor, a channel data processor, a special-purpose memory, or a data restructuring engine.

The apparatus for executing an instruction for an artificial intelligence chip provided in the above embodiments of the present disclosure receives descriptive information of a neural network model sent by a CPU, then analyzes the descriptive information to acquire at least one operation instruction, then determines a special-purpose execution component executing the operation instruction, locks the special-purpose execution component, then sends the operation instruction to the special-purpose execution component executing the operation instruction, waits for feedback on execution from the special-purpose execution component, and finally unlocks the special-purpose execution component executing the operation instruction after receiving a notification that the operation instruction is completely executed, thereby avoiding frequent interaction between the artificial intelligence chip and the CPU, and improving the performance of the artificial intelligence chip.

Figure 6:
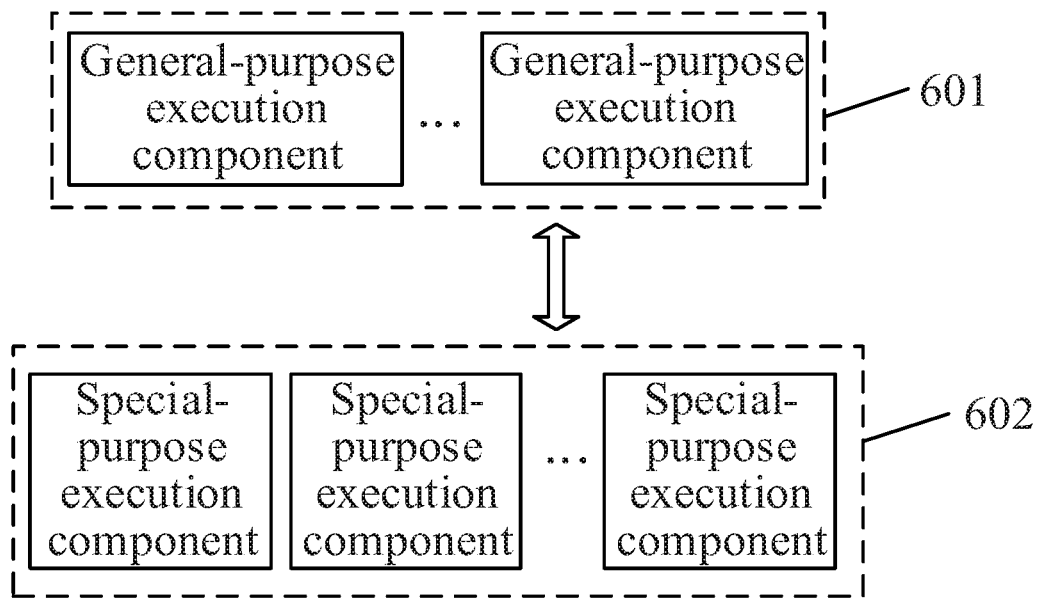
FIG. 6 is a schematic structural diagram of an embodiment of an artificial intelligence chip according to the present disclosure.

An embodiment of the present disclosure further provides an artificial intelligence chip. FIG. 6 may be referred to for a structure of the artificial intelligence chip. A schematic structural diagram of an embodiment of the artificial intelligence chip of the present disclosure is shown. As shown in FIG. 6, the artificial intelligence chip 600 in the present embodiment may include at least one general-purpose execution component 601 and at least one special-purpose execution component 602.

Figure 7:
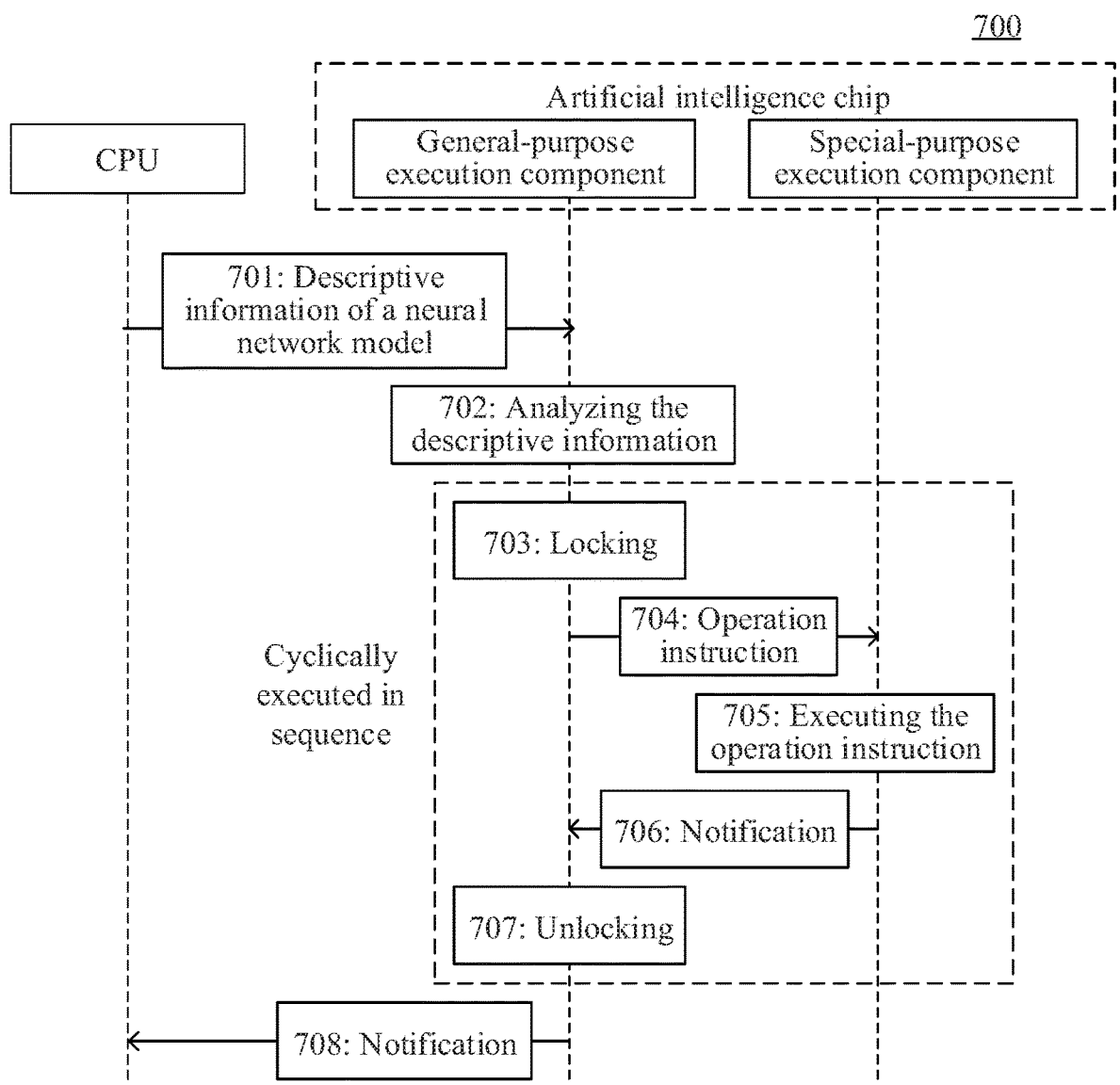
FIG. 7 is a working sequence chart of the artificial intelligence chip of the embodiment shown in FIG. 6.

Then, the working principle of the artificial intelligence chip will be described with reference to FIG. 7. FIG. 7 shows a working sequence 700 of the artificial intelligence chip 600.

First, at block 701, a CPU sends descriptive information for describing a neural network model to a general-purpose execution component of the artificial intelligence chip. The descriptive information may include at least one operation instruction.

Then, at block 702, the general-purpose execution component analyzes the received descriptive information to acquire the at least one operation instruction included in the descriptive information.

Then, for each instruction, steps in block 703 to block 707 are cyclically executed in sequence, until all of the at least one instruction is completely executed.

At block 703, for each operation instruction of the at least one operation instruction, the general-purpose execution component can determine a special-purpose execution component executing the operation instruction, and then lock the determined special-purpose execution component. As an example, the operation instruction is a convolution instruction, then the special-purpose execution component executing the operation instruction can be determined as a convolution engine, and the convolution engine can be locked.

At block 704, for each operation instruction of the at least one operation instruction, the general-purpose execution component can send the operation instruction to the special-purpose execution component executing the operation instruction after locking the special-purpose execution component executing the operation instruction.

At block 705, the special-purpose execution component can execute the operation instruction sent by the general-purpose execution component.

At block 706, the general-purpose execution component can receive a notification returned by the special-purpose execution component. The notification is used for instructing the operation instruction being completely executed.

At block 707, for each operation instruction of the at least one operation instruction, the general-purpose execution component can unlock the special-purpose execution component executing the operation instruction after receiving the notification instructing the operation instruction being completely executed.

Finally, at block 708, the general-purpose execution component can send a notification for instructing the at least one operation instruction being completely executed to the CPU after determining the at least one operation instruction being completely executed.

The artificial intelligence chip provided in the above embodiments of the present disclosure receives descriptive information of a neural network model sent by a CPU and analyzes the descriptive information to acquire at least one operation instruction by a general-purpose execution component, and then invokes special-purpose execution components successively by the general-purpose execution component to execute the operation execution, thereby avoiding frequent interaction with the CPU, and improving the performance of the artificial intelligence chip.

An embodiment of the present disclosure further provides an electronic device. The structure of the electronic device can be referred to FIG. 8 which shows a schematic structural diagram of a computer system 800 of an embodiment of the electronic device of the present disclosure. The electronic device shown in FIG. 8 is merely an example, and should not limit the function and scope of use of the embodiments of the present disclosure.

Figure 8:
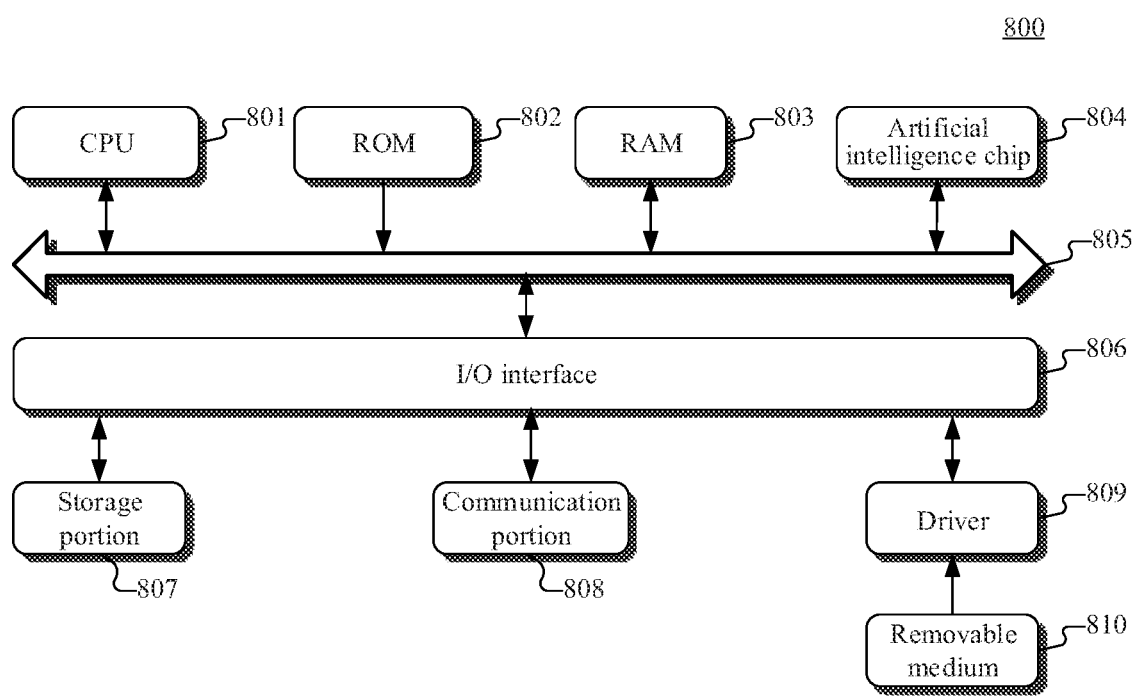
FIG. 8 is a schematic structural diagram of a computer system of an embodiment of an electronic device according to the present disclosure.

As shown in FIG. 8, the computer system 800 includes at least one central processing unit (CPU) 801 and at least one artificial intelligence chip 804. The CPU 801 may execute various appropriate actions and processes in accordance with a program stored in a read-only memory (ROM) 802 or a program loaded into a random access memory (RAM) 803 from a storage portion 807. The artificial intelligence chip 804 includes at least one general-purpose execution component and at least one special-purpose execution component, and the artificial intelligence chip 804 may execute various appropriate actions and processes in accordance with a program received from the CPU 801. The RAM 803 also stores various programs and data required by operations of the system 800. The CPU 801, the ROM 802, the RAM 803 and the artificial intelligence chip 804 are connected to each other through a bus 805. An input/output (I/O) interface 806 is also connected to the bus 805.

The following components are connected to the I/O interface 806: a storage portion 807 including a hard disk or the like; and a communication portion 808 including a network interface card, such as a LAN card and a modem. The communication portion 808 performs communication processes via a network, such as the Internet. A driver 809 is also connected to the I/O interface 806 as required. A removable medium 810, such as a magnetic disk, an optical disk, a magneto-optical disk, and a semiconductor memory, may be installed on the driver 809, so that a computer program read therefrom is installed on the storage portion 807 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 808, and/or may be installed from the removable medium 810. The computer program, when executed by the artificial intelligence chip 804, implements the functions as defined by the methods of the present disclosure.

It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an information receiving unit, an information analyzing unit, and an instruction sending unit. Here, the names of these units do not in some cases constitute a limitation to such units themselves. For example, the information receiving unit may also be described as "a unit configured to receive descriptive information for describing a neural network model sent by a CPU."

In another aspect, the present disclosure further provides a computer-readable medium. The computer-readable storage medium may be included in the general-purpose execution component in the artificial intelligence chip in the above described embodiments, or a stand-alone computer-readable medium not assembled into the general-purpose execution component. The computer-readable medium stores one or more programs. The one or more programs, when executed by the general-purpose execution component, cause the general-purpose execution component to: receiving descriptive information for describing a neural network model sent by a CPU, the descriptive information including at least one operation instruction; analyzing the descriptive information to acquire the at least one operation instruction; and determining, for an operation instruction of the at least one operation instruction, a special-purpose execution component executing the operation instruction, and locking the determined special-purpose execution component; sending the operation instruction to the determined special-purpose execution component; and unlocking the determined special-purpose execution component in response to receiving a notification for instructing the operation instruction being completely executed.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for executing an instruction for an artificial intelligence chip, the artificial intelligence chip comprising at least one general-purpose execution component and at least one special-purpose execution component, the method comprising:

receiving descriptive information for describing a neural network model sent by a central processing unit, the descriptive information including at least one operation instruction;

analyzing the descriptive information to acquire the at least one operation instruction; and determining, for an operation instruction of the at least one operation instruction, a special-purpose execution component executing the operation instruction, and locking the determined special-purpose execution component; sending the operation instruction to the determined special-purpose execution component; and unlocking the determined special-purpose execution component in response to receiving a notification for instructing the operation instruction being completely executed.

2. The method according to claim 1, wherein the locking the determined special-purpose execution component comprises:

acquiring a lock of the determined special-purpose execution component; and performing the locking operation in response to success in acquiring the lock.

3. The method according to claim 2, wherein the locking the determined special-purpose execution component further comprises:

querying a lock state of the determined special-purpose execution component by polling in response to failure in acquiring the lock; and continuing acquiring the lock of the determined special-purpose execution component to perform the locking operation in response to querying the lock state of the determined special-purpose execution component being unlocked.

4. The method according to claim 2, wherein the locking the determined special-purpose execution component further comprises:

entering a waiting state in response to failure in acquiring the lock; and exiting the waiting state in response to receiving a wakeup notification for instructing the determined special-purpose execution component being unlocked, and continuing acquiring the lock of the determined special-purpose execution component to perform the locking operation.

5. The method according to claim 1, further comprising:

sending a notification for instructing the at least one operation instruction being completely executed to the central processing unit in response to determining the at least one operation instruction being completely executed.

6. The method according to claim 1, wherein the at least one general-purpose execution component is connected in parallel, and the at least one special-purpose execution component is connected in series.

7. The method according to claim 6, wherein the at least one general-purpose execution component comprises a programmable general-purpose computing graphics processor, and the at least one special-purpose execution component comprises at least one of: a convolution engine, a single data processor, a plane data processor, a channel data processor, a special-purpose memory, or a data restructuring engine.

8. An apparatus for executing an instruction for an artificial intelligence chip, the artificial intelligence chip comprising at least one general-purpose execution component and at least one special-purpose execution component, the apparatus comprising:

at least one processor; and a memory storing instructions, the instructions when executed by the at least one processor, cause the at least one processor to perform operations, the operations comprising:

receiving descriptive information for describing a neural network model sent by a central processing unit, the descriptive information including at least one operation instruction;

analyzing the descriptive information to acquire the at least one operation instruction; and determining, for an operation instruction of the at least one operation instruction, a special-purpose execution component executing the operation instruction, and lock the determined special-purpose execution component; sending the operation instruction to the determined special-purpose execution component; and unlocking the determined special-purpose execution component in response to receiving a notification for instructing the operation instruction being completely executed.

9. The apparatus according to claim 8, wherein the locking the determined special-purpose execution component comprises:

acquiring a lock of the determined special-purpose execution component; and performing the locking operation in response to success in acquiring the lock.

10. The apparatus according to claim 9, wherein the locking the determined special-purpose execution component further comprises:

querying a lock state of the determined special-purpose execution component by polling in response to failure in acquiring the lock; and continuing acquiring the lock of the determined special-purpose execution component to perform the locking operation in response to querying the lock state of the determined special-purpose execution component being unlocked.

11. The apparatus according to claim 9, wherein the locking the determined special-purpose execution component further comprises:

entering a waiting state in response to failure in acquiring the lock; and exiting the waiting state in response to receiving a wakeup notification for instructing the determined special-purpose execution component being unlocked, and continuing acquiring the lock of the determined special-purpose execution component to perform the locking operation.

12. The apparatus according to claim 8, the operations further comprising:

sending a notification for instructing the at least one operation instruction being completely executed to the central processing unit in response to determining the at least one operation instruction being completely executed.

13. The apparatus according to claim 8, wherein the at least one general-purpose execution component is connected in parallel, and the at least one special-purpose execution component is connected in series.

14. The apparatus according to claim 13, wherein the at least one general-purpose execution component comprises a programmable general-purpose computing graphics processor, and the at least one special-purpose execution component comprises at least one of: a convolution engine, a single data processor, a plane data processor, a channel data processor, a special-purpose memory, or a data restructuring engine.

15. An artificial intelligence chip, comprising at least one general-purpose execution component and at least one special-purpose execution component;

the general-purpose execution component being configured to: receive descriptive information for describing a neural network model sent by a central processing unit, the descriptive information including at least one operation instruction; analyze the descriptive information to acquire the at least one operation instruction; determine, for an operation instruction of the at least one operation instruction, a special-purpose execution component executing the operation instruction, and lock the determined special-purpose execution component; send the operation instruction to the determined special-purpose execution component; and unlock the determined special-purpose execution component in response to receiving a notification for instructing the operation instruction being completely executed; and the special-purpose execution component being configured to: execute, in response to receiving the operation instruction sent by the general-purpose execution component, the received operation instruction; and return the notification for instructing the operation instruction being completely executed after the received operation instruction is completely executed.

16. A non-transitory computer readable medium, storing a computer program thereon, wherein the computer program, when executed by an execution component, implements the method according to claim 1.

17. An electronic device, comprising: a central processing unit, a storage apparatus, and at least one of the artificial intelligence chip according to claim 15.

* * * * *